(12) United States Patent
Finken

(10) Patent No.: US 8,817,940 B2
(45) Date of Patent: Aug. 26, 2014

(54) NUCLEAR PLANT WITH A PEBBLE BED NUCLEAR REACTOR

(75) Inventor: Holger Gerhard Clemens Finken, Pretoria (ZA)

(73) Assignee: Pebble Bed Modular Reactor (Proprietary) Limited, Centurion (ZA)

( * ) Notice: Subject to any disclaimer, the term of this patent is extended or adjusted under 35 U.S.C. 154(b) by 0 days.

(21) Appl. No.: 13/418,298

(22) Filed: Mar. 12, 2012

(65) Prior Publication Data

US 2012/0230458 A1    Sep. 13, 2012

Related U.S. Application Data

(62) Division of application No. 11/996,947, filed as application No. PCT/IB2007/050413 on Feb. 8, 2007, now abandoned.

(51) Int. Cl.
*G21C 7/107* (2006.01)
*G21C 1/07* (2006.01)

(52) U.S. Cl.
CPC ............ *G21C 1/07* (2013.01); *G21Y 2004/30* (2013.01); *G21Y 2002/303* (2013.01); *Y02E 30/36* (2013.01); *G21Y 2002/304* (2013.01)
USPC .......................................................... 376/265

(58) Field of Classification Search
None
See application file for complete search history.

(56) References Cited

U.S. PATENT DOCUMENTS

| 2,975,116 | A | * | 3/1961 | Farrington Daniels | 376/171 |
| 7,403,585 | B2 | * | 7/2008 | Ougouag et al. | 376/381 |
| 2003/0227994 | A1 | * | 12/2003 | Curtolo et al. | 376/381 |
| 2006/0050835 | A1 | * | 3/2006 | Bazant | 376/381 |

FOREIGN PATENT DOCUMENTS

| DE | 30 40 606 | | 5/1982 |
| DE | 3040606 | * | 5/1982 |
| WO | WO 02/01577 | | 1/2002 |
| WO | WO0201577 | * | 1/2002 |
| WO | WO 03/043025 | | 5/2003 |
| WO | WO03043025 | * | 5/2003 |
| WO | WO 2004/038267 | | 5/2004 |
| WO | WO2004038267 | * | 5/2004 |

OTHER PUBLICATIONS

Internatinal Preliminary Report on Patentability, mailed Aug. 12, 2008 in corresponding international application PCT/IB2007/050413.*
International Preliminary Report on Patentability, mailed Aug. 12, 2008, in corresponding International Application No. PCT/IB2007/050413.

* cited by examiner

*Primary Examiner* — Jack W Keith
*Assistant Examiner* — Sean P Burke
(74) *Attorney, Agent, or Firm* — Klarquist Sparkman, LLP

(57) ABSTRACT

This invention relates to a nuclear plant including a main power system and a fuel handling and storage system. The system is connected to a sphere inlet and a sphere outlet of a multi-pass high temperature gas cooled pebble bed reactor. The system is configured such that gas flows from the system into the reactor through both the sphere inlet and the sphere outlet thereby inhibiting the ingress of high temperature gas from the reactor into the system. Restricting indexers permit the movement of spheres between the reactor and the system and dampen out the transmission of pressure fluctuations from the power system to the system.

9 Claims, 1 Drawing Sheet

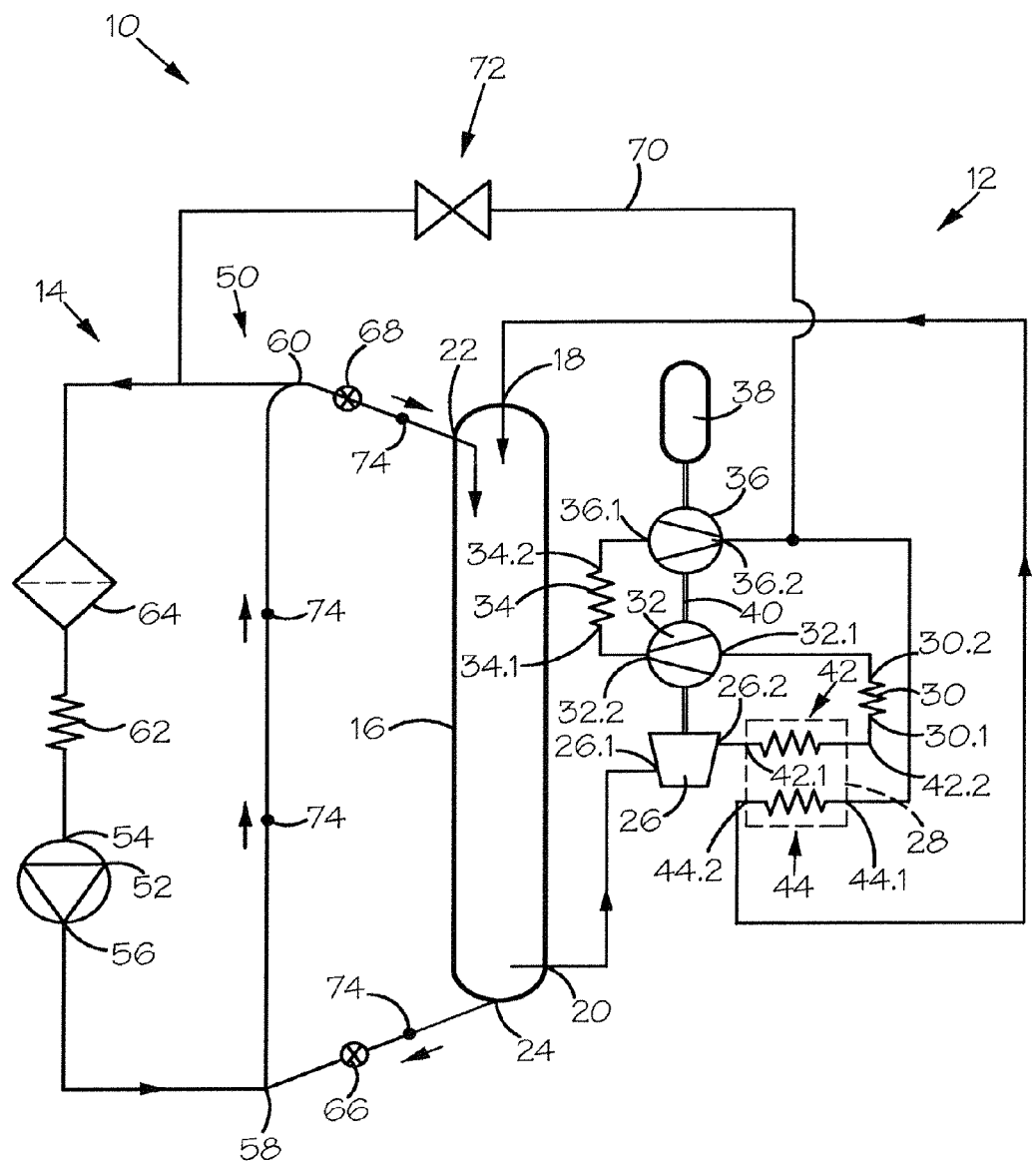

NUCLEAR PLANT WITH A PEBBLE BED NUCLEAR REACTOR

CROSS REFERENCE TO RELATED APPLICATION

This is a division of U.S. application Ser. No. 11/996,947, filed Jan. 25, 2008, now abandoned which was the National Stage of International Application No. PCT/IB2007/050413, filed Feb. 8, 2007, the contents of which are incorporated herein by reference in their entirety.

This invention relates to nuclear power. More particularly, it relates to a nuclear plant. It further relates to a method of operating a nuclear plant.

In a nuclear reactor of the high-temperature gas-cooled type, use is made of fuel elements, and often moderator elements, which are spherical in shape. These are referred to as "pebbles" and a reactor of this type is generally known as a pebble bed reactor. In a pebble bed reactor it is known to operate a multi-pass fuelling scheme in which fuel spheres are passed through a core of the reactor more than once in order to optimise burn-up of fuel. In comparison with other fuelling schemes, a multi-pass fuelling scheme is believed to provide for a more uniform distribution of burn-up within the core and thereby flattens the axial neutron flux profile and maximises thermal power output of the reactor core. The fuel spheres and, if applicable, moderator spheres are conveyed to an inlet in a reactor or a storage vessel in a sphere flow path, partly by gravity but predominantly using gas flow.

Although the invention will find application particularly with fuel spheres it will, as mentioned above, also find application with moderator spheres. In the context of this specification, the term "spheres" will be considered to be broad enough to include both fuel spheres and, where appropriate, moderator spheres.

The spheres are fed into the reactor through one or more sphere inlets at or adjacent the top thereof, from where they fall onto an upper surface of a bed or spheres in the reactor core. The spheres are drawn from the reactor vessel at or adjacent the bottom thereof through one or more sphere outlets.

The spheres are conveyed between the or each sphere outlet and the or each sphere inlet by a fuel handling and storage system. The fuel handling and storage system includes, inter alia, a network of pipes connecting the sphere outlets and sphere inlets in communication and a blower for causing gas flow through the network of pipes capable of entraining the spheres and transporting them through the pipes. An example of a fuel handling and storage system of this type is set out in Applicant's earlier application US 2003/0227994 which is incorporated herein by reference.

In a plant making use of a closed loop Brayton cycle as the thermodynamic cycle, the reactor coolant, typically helium, is also used as working fluid. In order to control the power output of the main power system, the mass of working fluid in the main power system can be varied. This is achieved by using a helium inventory control system which includes one or more helium storage tanks which are connectable in flow communication with the main power system either to introduce helium into the main power system to increase power generated in the main power system or to remove helium from the main power system to decrease the power generated by the main power system. This arrangement results in rapid pressure fluctuations. Rapid pressure fluctuations can also occur during a faulted operation of the main power system, e.g. as a result of a turbine trip or failure.

The coolant gas is also used as the conveying medium in the fuel handling and storage system. Further, whilst the fuel handling and storage system must be connected to the reactor in order to permit spheres to be conveyed from the reactor outlet to the reactor inlet, it is undesirable to expose the components of the fuel handling and storage system to the high temperatures and pressure fluctuations of the main power system.

According to one aspect of the invention there is provided a nuclear plant which includes a pebble bed nuclear reactor having at least one sphere inlet at or towards an upper end thereof and at least one sphere outlet at or towards a lower end thereof; and a fuel handling and storage system which includes sphere flow path defining means defining a sphere flow path having a sphere inlet connected to the sphere outlet of the reactor and a sphere outlet connected to the sphere inlet of the reactor; and sphere flow path pressurizing means configured to create a flow of gas along at least part of the sphere flow path to convey spheres along the at least part of the sphere flow path and to pressurize the sphere flow path such that the pressure at the sphere inlet of the sphere flow path is higher than the pressure at the sphere outlet of the reactor and the pressure at the sphere outlet of the sphere flow path is higher than the pressure at the sphere inlet of the reactor such that gas flows from the fuel handling and storage system into the reactor This arrangement results in a gas leak flow from the fuel handling and storage system to the reactor which inhibits the ingress of hot gas from the reactor into the fuel handling and storage system.

The plant may include damping means configured to permit the passage of spheres between the reactor and the fuel handling and storage system and to dampen the transmission of pressure fluctuations in coolant of the reactor to the fuel handling and storage system.

The sphere flow path pressurising means may include a blower having an inlet and an outlet, the blower outlet being connected to the sphere flow path at a gas inlet and the blower inlet being connected to the sphere flow path at a gas outlet, the gas inlet being positioned at a level which is lower than the level of the sphere inlet of the sphere flow path such that spheres entering the sphere flow path from the reactor will move under the influence of gravity to the gas inlet where they will be entrained in a gas stream flowing through the sphere flow path and conveyed away from the gas inlet.

The plant may include a top flow restricting indexer positioned, relative to the direction of movement of the spheres, upstream of the sphere inlet of the reactor and a bottom flow restricting indexer positioned downstream of the sphere outlet of the reactor. The flow restricting indexers function as the damping means.

The top flow restricting indexer ma be positioned between the gas outlet of the sphere flow path and the sphere inlet of the reactor and the bottom flow restricting indexer may be positioned between the sphere outlet of the reactor and the gas inlet of the sphere flow path.

The plant may include a closed loop main power system which includes, in addition to the nuclear reactor, in series, at least one turbine and at least one compressor; and a feed line for feeding gas from the main power system to the fuel handling and storage system to replace gas which flows from the fuel handling and storage system into the reactor.

The main power system may further include a recuperator having a hot or low pressure side connected between the at least one turbine and the at least one compressor, and a cold or high pressure side connected between the at least one compressor and a gas or working fluid inlet of the reactor, the feed line leading from the main power system from a position between the at least one compressor and the cold side of the recuperator and being connected to the fuel handling and storage system between the gas outlet and the inlet of the blower.

According to another aspect of the invention there is provided a nuclear plant which includes a pebble bed nuclear reactor having at least one sphere inlet at or towards an upper end thereof and at least one sphere outlet at or towards a lower end thereof; and a fuel handling and storage system which includes sphere flow path defining means defining a sphere flow path having a sphere inlet connected to the sphere outlet of the reactor and a sphere outlet connected to the sphere inlet of the reactor; and damping means configured to permit movement of the spheres between the reactor and fuel handling and storage system and to dampen the transmission of pressure fluctuations in the coolant of the reactor gas to the fuel handling and storage system.

The damping means may include a top flow restricting indexer positioned, relative to the direction of movement of the spheres, upstream of the sphere inlet of the reactor and a bottom flow restricting indexer positioned downstream of the sphere outlet of the reactor.

According to yet another aspect of the invention there is provided a method of operating a nuclear plant having a pebble bed nuclear reactor having a sphere outlet and a sphere inlet and a fuel handling and storage system for conveying spheres from the sphere outlet of the reactor to the sphere inlet of the reactor which method includes the step of pressurising the fuel handling and storage system to create a leak flow from the fuel handling and storage system to the reactor.

The leak flow from the fuel handling and storage system to the reactor may be through both the sphere outlet and sphere inlet of the reactor.

The nuclear plant may include a closed loop main power system of which the reactor forms part and the method may include feeding gas from the main power system into the fuel handling and storage system to replace gas leaked from the fuel handling and storage system into the reactor. The gas may be fed from the main power system from a position where the gas in the main power system is at maximum pressure.

The invention will now be described, by way of example, with reference to the accompanying diagrammatic drawing which shows schematically a nuclear plant in accordance with the invention.

In the drawing, reference numeral 10 refers generally to a nuclear plant in accordance with the invention. The plant 10 includes a closed loop main power system, generally indicated by reference numeral 12 and a fuel handling and storage system, generally indicated by reference numeral 14.

The main power system 12 includes a high temperature gas cooled pebble bed nuclear reactor 16 having, a working fluid or coolant inlet 18 and outlet 20 and a sphere inlet 22 and sphere outlet 24. The plant 10 further includes a turbine 26, a recuperator 28, a pre-cooler 30, a low pressure compressor 32, an inter-cooler 34, a high pressure compressor 36 and an electrical generator 38. The generator 38 and compressors 32, 36 are mounted on a common shaft 40 to which the turbine 26 is drivingly connected.

The turbine 26 has an inlet 26.1 and an outlet 26.2. The inlet 26.1 is in flow communication with the outlet 20.

The recuperator 28 has a hot or low pressure side 42 and a cold or high pressure side 44. The low pressure side 42 has an inlet 42.1 and an outlet 42.2. The inlet 42.1 is connected in flow communication with the outlet 26.2.

The pre-cooler 30 has an inlet 30.1 and an outlet 30.2. The outlet 42.2 is in flow communication with the inlet 30.1.

The low pressure compressor 32 has an inlet 32.1 and an outlet 32.2. The outlet 30.2 is in flow communication with the inlet 32.1.

The inter-cooler 34 has an inlet 34.1 and an outlet 34.2. The outlet 32.2 is in flow communication with the inlet 34.1.

The high pressure compressor 36 has an inlet 36.1 and an outlet 36.2. The outlet 34.2 of the inter-cooler 34 is in flow communication with the inlet 36.1.

The high pressure side 44 of the recuperator 28 has an inlet 44.1 and an outlet 44.2. The outlet 36.2 of the high pressure compressor 36 is connected to the inlet 44.1 of the high pressure side 44 of the recuperator. The outlet 44.2 of the high pressure side of the recuperator 44 is connected to the inlet 18.

The fuel handling and storage system 14 includes a sphere flow path defining means defining a sphere flow path 50 having a sphere inlet 24 which is connected to the sphere outlet 24 of the reactor 16 and a sphere outlet 22 which is connected to the sphere inlet 22 of the reactor 16. The system 14 further includes a blower 52 which has an inlet 54 and an outlet 56. The outlet 56 is connected in flow communication with the sphere flow path 50 at a gas inlet indicated by reference numeral 58. The inlet 54 of the blower 52 is connected in flow communication with the sphere flow path 50 at a gas outlet 60. Mounted in series with the blower 52 are a heat exchanger 62 and a filter 64.

The gas inlet 58 is positioned at a level which is lower than the level of the sphere outlet 24. A bottom flow restricting indexer 66 is provided in the sphere flow path 50 at a position between the sphere outlet 24 and the gas inlet 58. Similarly, a top flow restricting indexer 68 is positioned in the sphere flow path 50 at a position between the gas outlet 60 and the sphere inlet 22.

A feed line 70 extends from a high pressure point of the main power system 12 at a position between the outlet 36.2 of the high pressure compressor 36 and the inlet 44.1 of the high pressure side 44 of the recuperator 28. A valve arrangement, generally indicated by reference numeral 72 is provided in the feed line 70. The valve arrangement 72 includes a non-return valve.

In use, working fluid or coolant, typically helium, is fed into the reactor 16 through the inlet 18. The heated working fluid exits the reactor through the outlet 20 and drives the turbine 26 which in turn drives the compressors 32, 36 and the generator 38. The working fluid is cooled in the recuperator 28 and the pre-cooler 30 prior to entering the low pressure compressor 32 where it is compressed. The working fluid is then cooled in the inter-cooler 34 before entering the high pressure compressor 36 from where it is fed to the low pressure side of the recuperator 28 and is heated by gas passing through the low pressure side 42 of the recuperator, before being returned to the reactor 16. Control of the power generated in the main power system 12 is achieved, inter alia, by making use of a helium inventory control system which controls the mass of working fluid in the main power system 12.

In the fuel handling and storage system 14, the blower 52 causes a stream of gas to flow through the sphere flow path 50 between the gas inlet 58 and the gas outlet 60. The fuel handling and storage system is arranged such that the pressure within the sphere flow path 50 is higher than that at the sphere inlet 22 and sphere outlet 24. Accordingly, there is a leak flow of gas from the sphere flow path 50 into the reactor 16 through the sphere inlet 22 and sphere outlet 24. It will be appreciated that helium is lost from the fuel handling and storage system 14 into the reactor 16 on a continuous basis. This loss of helium is made up by helium flowing through the feed line 70 into the fuel handling and storage system 14. It will be appreciated that the helium is drawn from the main power system 12 at a location which corresponds to the highest pressure of the main power system, i.e. where the pressure is higher than at the sphere inlet 22 and sphere outlet 24, and also at a position where the helium is at a relatively low temperature, typically of the order of 100° C.

As spheres 74 leave the reactor 16 through the sphere outlet 24, they move downwardly along the sphere flow path 50 under the influence of gravity against the direction of leak flow from the sphere flow path 50 to the reactor 16. The bottom flow restricting indexer 66 is arranged to permit the leak flow of helium into the reactor and at the same time to permit the spheres 74 to move through the sphere flow path 50 in the opposite direction. When the spheres 74 reach the gas inlet 58 they are entrained in the stream of gas flowing through the portion of the sphere flow path 50 between the gas inlet 58 and gas outlet 60 and transported there along.

One possible sphere route is that the spheres 74 are then fed through the top flow restricting indexer 68 and the sphere inlet 22 into the reactor.

The fuel handling and storage system 14 will typically incorporate sorting and management functions, e.g. for checking the integrity of the fuel elements and for removing damaged fuel elements. Further, the fuel handling and storage system will typically incorporate means for determining whether or not a fuel element is suitable for a further pass through the reactor and thereby separating spent fuel elements from used fuel elements which are still capable of producing useful energy. The details of the fuel handling and storage system are not necessary for an understanding of the principle of the invention and hence, are not described in detail The inventor believes that a plant in accordance with the invention will have the advantage that the leak flow of helium from the fuel handling and storage system 14 into the nuclear reactor will inhibit the ingress of high temperature gas from the reactor to the fuel handling and storage system. Further, the provision of the bottom flow restricting indexer 66 and top flow restricting indexer 68 permit the fuel handling and storage system to operate at relatively low temperatures thereby avoiding the need to design the components of the fuel handling and storage system to operate at high temperatures with a substantial cost saving and an increase in reliability. Further, the pressure of helium in the fuel handling and storage system will remain relatively stable or change slowly thereby reducing the risk of damage to components of the fuel handling and storage system owing to pressure fluctuations in the main power system.

By dampening out pressure fluctuations in the fuel handling and storage system the risk of the fuel handling and storage system blower 52 coming into contact with the catcher bearings is reduced. Further, excessive sphere velocity fluctuations in the sphere flow path are reduced thereby avoiding or at least limiting damage to the fuel elements. Further, the risk of damage to the filter cartridges of the filter 64 is reduced.

In addition, the design requirements on the blower 52 become less stringent thereby reducing the cost associated with the blower 52. In addition, valve effects and sonic shock waves in small diameter piping can be reduced or prevented. In addition, by preventing the ingestion of hot gasses from the main power system into the fuel handling and storage system, the various components on the fuel handling and storage system can be designed for lower temperatures thereby reducing the costs associated therewith. In addition, by receiving relatively small quantities of relatively cool make up gas from the main power system, the plate out of radio-nuclides in the fuel handling and storage system can be reduced.

The invention claimed is:

1. A method of operating a nuclear plant having (a) a closed loop main power system comprising a pebble bed nuclear reactor, which reactor has a sphere outlet and a sphere inlet, an electrical generator, a turbine drivingly connected to the electrical generator, and a high pressure compressor and (b) a fuel handling and storage system for handling and storing fuel spheres and moderator spheres, which system comprises a network of pipes that defines a sphere flow path having a sphere inlet connected to the sphere outlet of the reactor and a sphere outlet connected to the sphere inlet of the reactor, the sphere flow path extending from the sphere outlet of the reactor to the sphere inlet of the reactor, which method includes:

receiving heated coolant gas from the reactor;

cooling the heated coolant gas to a temperature that is lower than the temperature inside the reactor which inhibits plate out of radio-nuclides in the fuel handling and storage system;

introducing such cooled coolant gas from a position downstream of the high pressure compressor into the sphere flow path at a pressure sufficient that the pressure at the sphere inlet of the sphere flow path is higher than the pressure at the sphere outlet of the reactor and the pressure at the sphere outlet of the sphere flow path is higher than the pressure at the sphere inlet of the reactor, thereby to create a leak flow from the fuel handling and storage system to the reactor; and flowing the cooled coolant gas along the sphere flow path to convey spheres along the sphere flow path from the sphere outlet of the reactor to the sphere inlet of the reactor.

2. A method as claimed in claim 1, in which the introducing such cooled coolant gas includes feeding coolant gas from the main power system into the fuel handling and storage system in an amount sufficient to replace gas leaked from the fuel handling and storage system into the reactor.

3. A method as claimed in claim 1, in which the main power system further comprises a recuperator having a high pressure side including an inlet that is in communication with the outlet of the high pressure compressor and the introducing such cooled coolant gas includes feeding gas from the main power system from a position between the outlet of the high pressure compressor and the inlet of the high pressure side of the recuperator.

4. A method as claimed in claim 1, which includes dampening the transmission of pressure fluctuations in coolant of the reactor to the fuel handling and storage system.

5. A method as claimed in claim 1, which includes checking the integrity of the fuel spheres in the sphere flow path and removing damaged fuel spheres from the sphere flow path.

6. A method as claimed in claim 5, wherein the checking the integrity of the fuel spheres includes determining whether or not a fuel sphere is suitable for a further pass through the reactor and separating spent fuel spheres from used fuel spheres which are still capable of producing useful energy.

7. A method as claimed in claim 1, in which the sphere flow path has a gas inlet and a gas outlet and which includes feeding gas from an outlet of a blower to the gas inlet and feeding gas from the sphere flow path through the gas outlet to an inlet of the blower to create a flow of gas along the sphere flow path from the gas outlet towards the sphere inlet of the reactor.

8. A method as claimed in claim 7, in which the gas inlet is spaced from the sphere inlet of the sphere flow path outlet and fuel spheres and moderator spheres entering the sphere flow path move under the influence of gravity from the sphere inlet of the sphere flow path to the gas inlet.

9. A method as claimed in claim 1, in which the introducing such cooled coolant gas includes feeding gas from the main power system from a position where the gas in the main power system is at its highest pressure and lowest temperature.

* * * * *